US009294967B2

United States Patent
Sridhar et al.

(10) Patent No.: US 9,294,967 B2
(45) Date of Patent: Mar. 22, 2016

(54) CENTRALIZED CIRCUIT SWITCH FALLBACK

(71) Applicant: Taqua WBH, LLC, Richardson, TX (US)

(72) Inventors: Anuradha Sridhar, Plano, TX (US); Shan Jen Chiou, Plano, TX (US)

(73) Assignee: Taqua WBH, LLC, Richardson, TX (US)

( * ) Notice: Subject to any disclaimer, the term of this patent is extended or adjusted under 35 U.S.C. 154(b) by 89 days.

(21) Appl. No.: 14/046,611

(22) Filed: Oct. 4, 2013

(65) Prior Publication Data
US 2015/0098391 A1    Apr. 9, 2015

(51) Int. Cl.
*H04W 36/00*    (2009.01)
*H04W 60/00*    (2009.01)

(52) U.S. Cl.
CPC ........ *H04W 36/0022* (2013.01); *H04W 60/005* (2013.01)

(58) Field of Classification Search
CPC .. H04W 36/0022; H04W 60/04; H04W 88/16
See application file for complete search history.

(56) References Cited

U.S. PATENT DOCUMENTS

| 2014/0177592 | A1* | 6/2014 | Li et al. | 370/331 |
| 2014/0179318 | A1* | 6/2014 | Wang | 455/436 |
| 2015/0031357 | A1* | 1/2015 | Kaufman et al. | 455/433 |

* cited by examiner

*Primary Examiner* — Albert T Chou
(74) *Attorney, Agent, or Firm* — Norton Rose Fulbright US LLP (57) ABSTRACT

Systems and methods herein utilize interworking protocols with centralized functionality to perform CSFB with minimal latency for an inbound and/or outbound communication with a mobile device that is attached to a communication network not operable to service the communication. Embodiments utilize a centralized gateway that communicates in both an LTE network and CS network. In embodiments, the mobile device may be concurrently attached to the LTE network, registered with the centralized gateway, and registered with an MSC of the CS network. Upon the CS network receiving an inbound call for the mobile device or upon the mobile device originating a call, the MSC may set up the call with the mobile device with minimal latency because the mobile device is pre-registered with the MSC.

20 Claims, 5 Drawing Sheets

FIG. 3B

CENTRALIZED CIRCUIT SWITCH FALLBACK

TECHNICAL FIELD

Embodiments herein relate to circuit switch fallback operations in mobile communication networks and more specifically to centralizing functionality of circuit switch fallback operations in mobile communication networks.

BACKGROUND OF THE INVENTION

Cellular communications traditionally used 2G and 3G technology, which communicate using a circuit-switched (CS) network to provide voice services and low speed data services and packet-switched networks to for high-speed data services. In cellular communications, the traditional networks are slowly being replaced by long term evolution (LTE) networks, which in embodiments communicate using 4G technology. In contrast to a CS network, an LTE network is a purely packet-switched network and does not inherently support voice services. The transition from a full CS network to a full LTE network is slow coming, and currently, there are circumstances when it may be advantageous to communicate via a CS network while at other times, it may be advantageous to communicate via an LTE network. As such, there is a desire in the industry to implement infrastructure changes that allow a mobile device to switch back and forth between a CS network and an LTE network such that the mobile device can communicate using either of the networks, as is desired.

A number of methods have been proposed to providing voice communications in the LTE networks. If support for voice communications is not available over the LTE network, service providers leverage existing CS networks to provide voice services. Therefore interworking solutions are needed to enable interworking between the LTE and the existing CS networks. One of the interworking solutions is the Single Radio Voice Call Continuity (SRVCC) defined in the 3GPP standard TS 23.216, wherein an LTE voice call is handed over to a 3G network whenever LTE coverage is not available for mobile devices in call. Another interworking solution is called Circuit Switch Fallback (CSFB) for example, as detailed in 3GPP standard TS 23.272. In this approach, the mobile device may register with the CS network after attaching to the LTE network. For voice services, the mobile device may be redirected or handed over to the CS network from the LTE network. For redirection to work, it is a pre-requisite for the mobile device to be attached in the LTE network as well as registered in the CS network.

In the industry today, mobile devices often have dual functionality such that they are configured to operate in both the LTE network and the CS network. Generally, the LTE network is used for data communications while the CS network is used for voice communications. As such, when a mobile device is sending uplink and/or downlink data transmissions, it is preferable that the mobile device communicate using the LTE network. Further, when a mobile device is sending uplink and/or downlink voice transmissions, it may be preferable that the mobile device communicate using the CS network. In operation, mobile devices tend to transmit more data communications than voice communications. For example, users tend to browse the internet and utilize apps more than they talk on the phone. To accommodate this typical use of the mobile device, many mobile devices are set to default to the LTE network. In such embodiments, the mobile device may switch to the CS network (e.g., perform a CSFB) when a voice communication is desired.

For example, a mobile device may be configured such that its default network is an LTE network. When a short message service (SMS), is sent to the mobile device, the mobile device is likely already on its default LTE network. As such, because the mobile device is already on the LTE network, the mobile device does not need to switch networks in order to receive the SMS. Likewise, when the mobile device wants to send an SMS, because the mobile device is already on the LTE network, the mobile device does not need to switch networks in order to send the SMS.

However, because the mobile device's default network is the LTE network, the same cannot be said when the mobile device wants to originate or receive a voice communication (e.g., a phone call). When a user wants to originate a voice communication (e.g., make a phone call) using a mobile device, the user will indicate to the mobile device that voice communication is desired. For example, the user may input a phone number and touch a send input. For mobile devices that support LTE and CSFB for voice services, when a user originates a call, the mobile device sends the request to the LTE network with an indication that it supports CSFB. Upon receiving such a request, the LTE network directs the mobile to connect with the CS network to make the call.

For mobile terminating calls, a mobile device may be paged in the LTE network and upon the mobile device responding to the page, the mobile device may be directed by the LTE network to switch to the CS network (e.g., CSFB) for the call. In order to support CSFB operation, industry has developed two different methods: (1) Mobile Switching Center (MSC) upgrading, which upgrades the existing MSC to support communication with the Mobility Management Entity (MME) in the LTE network and (2) virtual MSC, which involves a Circuit Switch Fallback Inter-working Function (CSFB IWF) supporting the communication with the MME and acting like a Mobile Switching Center/Visitor Location Register (MSC/VLR) in the CS network. The CSFB IWF solution requires no upgrades to the existing MSC.

The Mobile Switching Center (MSC) upgrading method developed as follows. A MSC is a legacy switching center, which is operable in a CS network. Most MSCs in operation today were designed and installed prior to the development of the LTE network and prior to CSFB. As such, legacy MSCs are not equipped with the hardware and software necessary to locally perform CSFB. Recently, there has been a move by MSC vendors to replace old MSCs with new MSCs that have hardware and software configured to locally perform CSFB. Further, some MSC vendors have developed upgrading packages which upgrade the hardware and/or software of legacy MSCs, thereby enabling them to locally perform CSFB.

The methods used to replace and/or update the MSCs have been sufficient in locally performing CSFB; however, the endeavor is costly. The amount of programming and cost of hardware causes this upgrade method to cost between half a million to one million dollars per MSC unit. As such, because many network providers utilize multiple MSCs in their networks, updating legacy MSCs may not be a viable option for many service providers.

Accordingly, because industry was looking for an alternative solution to MSC upgrading, other vendors developed a centralized solution involving virtual MSC. In this solution, a new device was added to the network which communicated with several legacy MSCs and had the functionality needed to inform a mobile device when CSFB may be desirable. The new devices, which were added to the networks, were unique versions of a visitor location registration (VLR) and were sometimes called a voice service gateway (VSG). A single VSG could provide the desired functionality in a centralized location on behalf of several MSCs thereby minimizing the cost of implementation. However, VSGs were not embraced by network providers because in operation, the VSGs have proven to add additional delay to the call set up time and has not met mobile user expectations.

The virtual MSC method employed by the VSGs operated to inform a mobile device that an inbound voice communication was destined for the mobile device. The inbound call was first received at an MSC of the CS network, and the MSC was tasked with finding the mobile device so that the MSC may deliver the voice communication to the mobile device. According to the method, the MSC (e.g. gateway MSC (gMSC)) queried a home location registration (HLR) of the CS network to request routing information for use in routing the incoming voice communication to the mobile device. In this method, the HLR then queried the VSG which was configured to communicate with devices in both the CS network and the LTE network. Because the VSG could communicate with both networks, the VSG could receive a query from the HLR (of the CS network) and assist in locating a mobile device on the LTE network.

Upon the VSG receiving the query from the HLR, the VSG located the mobile device as being attached to the LTE network and determined which mobility management entity (MME) of the LTE network was in communication with the mobile device. Upon determining which MME was in communication with the mobile device, the VSG sent a request to the MME requesting that the MME send a page to the mobile device informing the mobile device that a voice communication was inbound for the mobile device. Due to the page, the mobile device was able to determine that it may be desirable to switch back to the CS network. During and/or after switching back to the CS network, CS network and the mobile device performed operations to register the mobile device with the CS network. If the mobile device was able to successfully switch back to the CS network and properly register to the serving MSC (sMSC) with the CS network, the mobile device informed the MME of the successful CSFB and the MME relayed this information to the VSG.

Further, after the VSG determined that the mobile device had successfully switched back to the CS network and was properly registered to Serving MSC (sMSC) with the CS network, the VSG then queries HLR (second query) for the actual mobile device location. During this second query, HLR asked the sMSC to provide mobile station roaming number (MSRN) such that the call can be routed to sMSC for terminating the call to the mobile device. When sMSC receives the request and responds back the MSRN to the HLR, then to the VSG. Then VSG was able to respond the initial request by using the MSRN received from sMSC to the HLR, and the HLR was able to answer the gMSC's query by sending the MSRN to gMSC. With the mobile device's routing number, the gMSC sent the voice communication to sMSC to terminate the call to the mobile device.

While, the above method enabled mobile devices to determine when it may be desirable to switch back to the CS network and enabled the inbound voice communication to reach the mobile device, all steps of the above method were performed in the time period after the inbound call was placed (e.g., after the caller placed the call) but before the mobile device indicated to the user that a call was incoming (e.g., before the callee's phone rang). Performing all of the steps after the inbound call was placed added a delay of 3-5 seconds, which was discovered to be unacceptable to the service provider's customers. Further, because the mobile device's default network is the LTE network, after the voice communication was concluded (e.g., after the call was finished), the mobile device automatically switched back to the LTE network. As such, the steps involved in the virtual MSC method were performed for each and every voice communication that was inbound for the mobile device. Thus, every inbound call experienced the aforementioned 3-5 second delay, which made the method further unacceptable to the service provider's customers.

Because the service provider's customers were not satisfied by virtual MSC solution, the solution was not accepted by the industry, thereby leaving the industry with the previously described MSC upgrading solution. However, as explained, due to the cost prohibitive nature of the MSC upgrading solution, a new solution which resolves the time delay created by Virtual MSC while minimizing the costs associated with MSC upgrading is desired.

BRIEF SUMMARY OF THE INVENTION

Systems and methods herein centralize functionality involved in circuit-switched fallback (CSFB) operations while minimizing delays associated with connecting an inbound as well as outbound communication to a mobile device that is attached to a communication network not operable to service the communication. In embodiments, the mobile device registration with the serving mobile switching center (sMSC) of the CS network may be enabled with a centralized gateway that is operable to communicate in both the long term evolution LTE network and the circuit switch (CS) network. Registration received by the centralized gateway may be triggered by the mobile device attaching to an LTE network and by the mobile device attaching to the CS network. Registering the mobile device with the centralized gateway may be accomplished using the LTE network and LTE network communications protocols. Upon registering with the centralized gateway, the centralized gateway may register the mobile device with a Mobile Switching Center (MSC) that is serving the territory within which the mobile device is located. The MSC may be a CS network device which communicates via a CS network; as such, the centralized gateway may use the CS network and CS network protocols when registering the mobile device with the MSC. In embodiments, the mobile device may be concurrently attached to the LTE network, registered with the centralized gateway, and registered with its serving MSC. As such, the mobile device may be registered with the MSC of the CS network even though the mobile device is attached to the LTE network.

In an example operation, upon the serving MSC receiving an indication that an inbound CS communication is intended for the mobile device, the serving MSC may inform the centralized gateway about the inbound CS communication. The serving MSC may use the CS network and CS communication protocols to inform the centralized gateway of the inbound CS communication. Upon being informed about the incoming CS communication, the centralized gateway may use the LTE network and LTE communication protocols to inform the mobile device that switching to the CS network may be desirable.

After receiving an indication that switching to the CS network may be desirable, the mobile device may switch to the CS network. When switching to the CS network, the mobile device may or may not detach from the LTE network. Further, the mobile device may inform the serving MSC via the CS network and using CS network communication protocols that the mobile device has switched to the CS network. In response to the mobile device informing the serving MSC that the mobile device has switched to the CS network, the serving MSC may forward the incoming CS communication to the mobile device.

Embodiments herein register the mobile device with a second network while the mobile device is attached to first network, wherein the first network communicates according to communication protocols that are different from the communication protocols of the second network. For example, embodiments register the mobile device with a CS network while the mobile device is attached to an LTE network. In exemplary embodiments, systems and methods register the mobile device with the serving MSC of a CS network before the origination of a CS communication that is inbound for the mobile device or outbound from the mobile device. Pre-registering the mobile device with the CS communication network reduces the delay that mobile device users experience between the moment the CS communication originated and the moment the CS communication is established with the termination device. In an example where the CS communication is a phone call, pre-registering the mobile device with the CS communication network reduces the delay that network provider's users experience between the moment the phone call was originated by the caller and the moment the callee's mobile device rings. Because the mobile device is registered with the CS network before the call, the registration with the CS network can be considered a pre-registration.

As such, the embodiments herein provide the industry with a solution wherein the CSFB operations are centralized to a centralized gateway thereby avoiding the need to upgrade each and every MSC of a network and saving the service provider a considerable amount of time and money. Further, centralized embodiments herein enable pre-registration and therefore do not cause network customers to experience considerable delays associated with call setups.

The foregoing has outlined rather broadly the features and technical advantages of embodiments of the invention in order that the detailed description that follows may be better understood. Additional features and advantages of embodiments will be described herein after which form the subject of the claims. It should be appreciated by those skilled in the art that the conception and specific embodiment disclosed may be readily utilized as a basis for modifying or designing other structures for carrying out the same purposes described herein. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
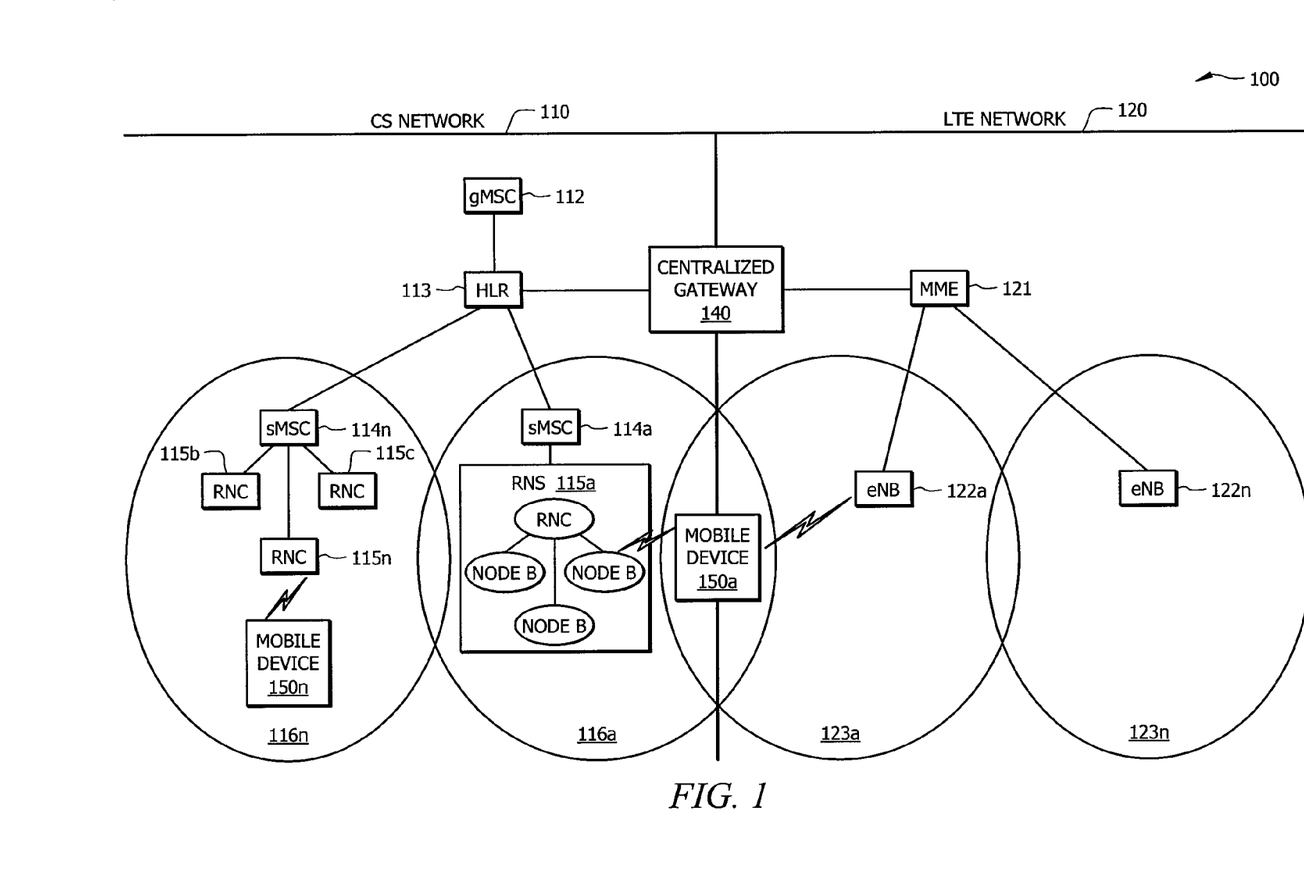
FIG. 1 is an example system configured to operate as described herein.

FIG. 1 is an example system 100 configured to centralize functionality involved in circuit switch fallback (CSFB) operations while utilizing pre-registration to minimize delays associated with connecting an inbound or outbound communication to a mobile device that is attached to a communication network not operable to service said communication. System 100 comprises at least two networks, wherein communication protocols of the first network are not supported by the second network. In this example, system 100 comprises at least circuit switch (CS) network 110 and long term evolution (LTE) network 120. CS network 110 may communicate using 3G and/or 2G communication protocols and equipment, and LTE network 120 may communicate using 4G communication protocols and equipment.

The left side of FIG. 1 shows example equipment of CS network 110. CS network 110 may include more or less equipment as is shown. CS network 110 may comprise one or more mobile switching center (MSC), for example gateway mobile switching center (gMSC) 112 and/or serving mobile switching centers (sMSC) 114a and 114n. An MSC may comprise one or more computer processors having access to one or more memories utilized to control the functionality thereof. An MSC is a network element that controls network switching and supports mobile device registration, authentication, call location, handovers, and call routing to a mobile subscriber. MSC may assist with and/or handle CS communication setup (e.g. call setup), CS communication release (e.g., call release, call teardown, etc.), CS communication routing (e.g. call routing), hand overs between base stations, and more. CS network 110 may comprise a plurality of MSCs some of which may be gMSCs and some of which may be sMSCs. A gMSC may receive incoming CS communications (e.g., an incoming call from a mobile device or from a public switch telephone network (PSTN)) and handle call routing functions such as querying a home location register (HLR) for call routing information. A sMSC may service mobile devices and aid in call setups and teardowns with mobile devices located within the sMSC's servicing territory.

A sMSC may have a sMSC service territory (e.g., 116a and 116n). A sMSC service territory may be a geographic region that is serviced by a particular sMSC. CS network 110 may comprise any number of gMSCs, sMSCs, and sMSC territories, as is desirable. gMSCs and sMSCs may be part of the CS network and may be configured to communicate according to CS communication protocols.

In 3G CS networks, sMSCs may be in communication with one or more Radio Network Subsystem (RNS) and/or Radio Network Controller (RNC), for example, RNS 115a and RNC 115b-115n, which may be used to communicate with mobile devices (e.g., 150a-150n). In embodiments, sMSC 114a may be in communication with RNS 115a, which may comprise a radio network controller (RNC) and one or more base stations, for example a node B. A RNC controls the node Bs that are connected to it and undertakes the radio resource management and some of the mobility management functions. Further, the RNC may be the point at which the data encryption/decryption is performed to protect the user data from eavesdropping.

A node B is a base station transceiver unit and comprises a transmitter and receiver, which may be used to send and receive communications with mobile device 150a. A sMSC may be in communication with any number of RNSs and RNCs. For example, sMSC 114n is shown as being in communication with a plurality of RNC 115b, RNC 115c, RNC 115n, etc. The RNSs with which a sMSC communicates may be the base stations that are located within the sMSC's territory. Further, the mobile devices with which a sMSC communicates, via an RNS, may be the mobile devices within the sMSC's territory. For example, sMSC 114n may communicate with mobile device 150n via RNC 115n. RNS 115a and RNCs 115b-115n are part of the CS network and are configured to communicate according to CS communication protocols.

CS network may also comprise one or more home location register (HLR) 113. HLR 113 may comprise one or more computer processors having access to one or more memories utilized to control the functionality thereof. An HLR may comprise a database storing administrative information about mobile devices and their associated users that have subscribed to a network as well as location information about the mobile devices including the last known location of the mobile devices. The information about a particular mobile device and its user may be stored as a user profile. The user profile may include information regarding services to which the user has subscribed and information about the mobile device itself. The user profile may be used to determine routing information when routing communications inbound for a particular mobile device. HLR 113 is part of the CS network and is configured to communicate according to CS communication protocols. When a user powers on a mobile device, the mobile device may register with the CS network (as described in detail below), and from the registration, it is possible to determine, based at least on the mobile device's location, which sMSC and RNS that the mobile device should communicate with so that incoming calls may be routed appropriately. Further, when the mobile device is powered on but not engaged in an active communication (e.g., a call), the mobile device may re-register periodically to ensure that the CS network and the HLR is aware of its latest position within the CS network.

The right side of FIG. 1 shows example equipment of LTE network 120. LTE network 120 may include more or less equipment as is shown. LTE network 120 may comprise one or more mobility management entity (MME) 121 in the signaling plane. MME 121 may comprise one or more computer processors having access to one or more memories utilized to control the functionality thereof. MME 121 may be a control node for LTE network 120 and may be responsible for authenticating the user, tracking mobile devices attached to LTE network 120 in idle mode, and sending and receiving messages (e.g., pages) to/from mobile devices attached to the LTE network. Further, non access stratum (NAS) signaling terminates at the MME, wherein NAS protocols form the highest stratum of the control plane between the mobile device and MME. The mobility management entity (MME) also provides the control plane function for mobility between LTE and 2G/3G access networks.

LTE network 120 may also comprise one or more base stations, e.g., eNB 122a through eNB 122n. The base stations may have an LTE cell coverage area, wherein a mobile device within the LTE cell communicates with the base station servicing the cell area. For example, eNB 122a may service LTE cell 123a and eNB 122n may service LTE cell 123n. In example system 100, mobile device 150a is within LTE cell 123a and is serviced by eNB 122a. Because mobile device 150a is serviced by eNB 122a (while located within LTE cell 123a), mobile device 150a sends and receives communications with eNB 122a. If mobile device 150a moves into LTE cell 123n, then mobile device 150a would send and receive communications with eNB 122n.

While in this example system, CS network 110 and LTE network 120 are shown as supporting separate base stations (e.g., RNS 115a and eNB122a), systems and methods herein may also support multi-RAT (Radio Access Technology). Further, while in this example, CS network 110 is shown as being a 3G network with RNSs, the CS network may comprise of a 2G network with one or more Global System for Mobile Communications Base Station Subsystem GSM BSS, one or more Base Transceiver Station (BTS), and one or more Base Station Controller (BSC) and may communicate with MSCs using Base Station Subsystem Application Part (BSSAP).

System 100 may also comprise devices which operate on multiple networks and are configured to communication according to the communication protocols of the multiple networks. For example, mobile device 150a is configured operate on multiple networks and is configured to communication according to the communication protocols of the multiple networks. Mobile device 150a may comprise one or more computer processors having access to one or more memories utilized to control the functionality thereof. Examples of mobile device 150a include but are not limited to a cell phone, a smart phone, a tablet, a laptop, a personal digital assistant (PDA), and or the like. In example system 100, mobile device 150a is configured to attach to CS network 110 and LTE network 120, communicate in CS network 110 and LTE network 120, and communicate using communication protocols of CS network 110 and LTE network 120.

System 100 may also comprise centralized gateway 140, which operates on multiple networks and is configured to communication according to the communication protocols of the multiple networks. Centralized gateway 140 may comprise one or more computer processors having access to one or more memories utilized to control the functionality thereof. Centralized gateway 140 may be configured to communicate with CS network 110 and LTE network 120 and communicate using the communication protocols of CS network 110 and LTE network 120. For example, centralized gateway 140 may receive a communication from CS network 110 using CS communication protocols, translate the communication into a communication that is compatible with LTE network 120, and send the communication to LTE equipment using LTE communication protocols. In embodiments, centralized gateway 140 may receive a request from one network, and based at least on the received request, perform operations which assist in fulfilling the request, then send a request to different network to further assist in fulfilling the original request.

Mobile device 150a may be configured to default to one of the multiple networks. For example, mobile device 150a may be a smart phone wherein a user is more likely perform data communications (e.g., search the internet) as compared to voice communications (send and receive phone calls). As such, in embodiments, mobile device 150a may be configured to default to LTE network 120, which provides data communications and may be configured for CSFB for voice services. In such embodiments, mobile device 150a will usually be attached to LTE network 120. From time to time, mobile device 150a may send or receive a CS communication. As such, mobile device 150a may want to attach to CS network 110 in order to send or receive a CS communication.

When mobile device 150a sends a CS communication, the user may indicate to mobile device 150a that an outgoing CS communication is desired. For example, if a user wants to make a phone call, the user may input a telephone number and touch a send indicator. In this example, mobile device 150a will communicate to LTE network 120 with an indication that it supports CSFB. LTE network 120, upon receiving this CSFB indication from mobile device 150a, will redirect mobile device 150a to CS network 110 to establish the call. For incoming calls to mobile device 150a, CS network 110 communicates with LTE network 120 to page mobile device 150a. When mobile device 150a answers the page in LTE network 120, LTE network redirects mobile device 150a to CS network 110 for call setup. Embodiments herein provide systems and methods that pre-register mobile device 150a with CS network 110 before mobile device 150a originates or receives voice services, inform mobile device 150a that is attached to LTE network 120 that a CS communication is incoming on CS network 110, perform a CSFB thereby switching mobile device 150a to CS network 110, and/or set up the CS communication with mobile device 150a.

Figure 2A:
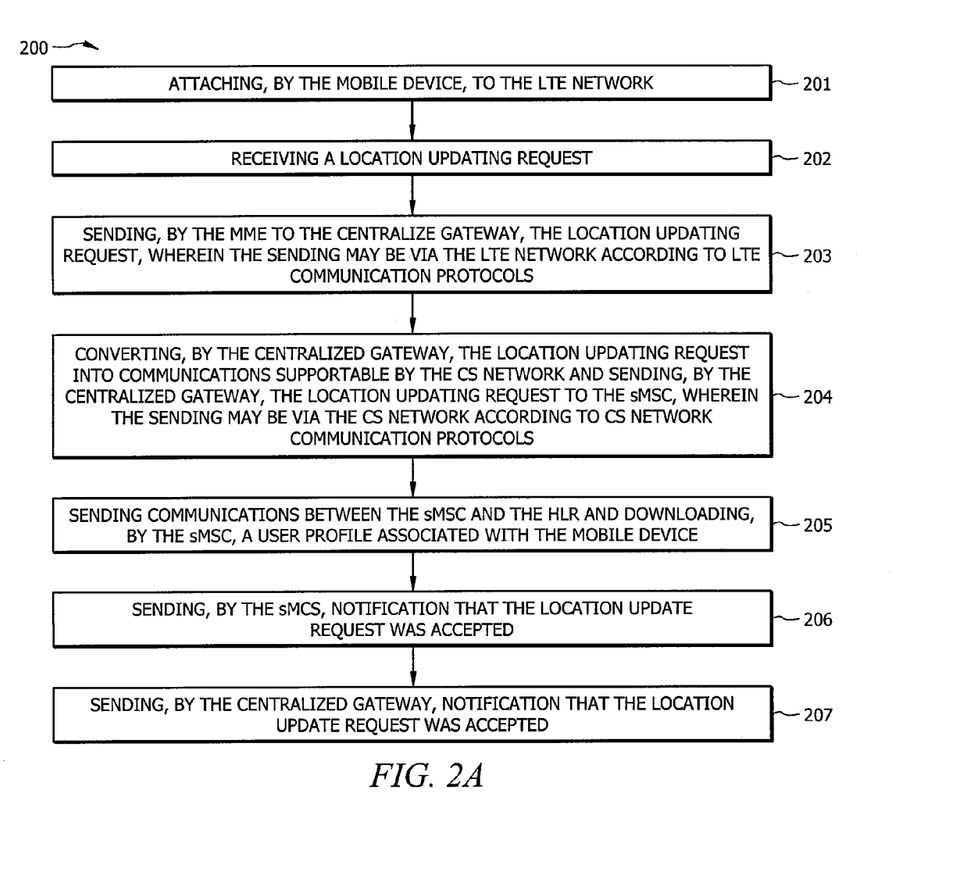
FIG. 2A is an example registration flow process of embodiments herein.
Figure 2B:
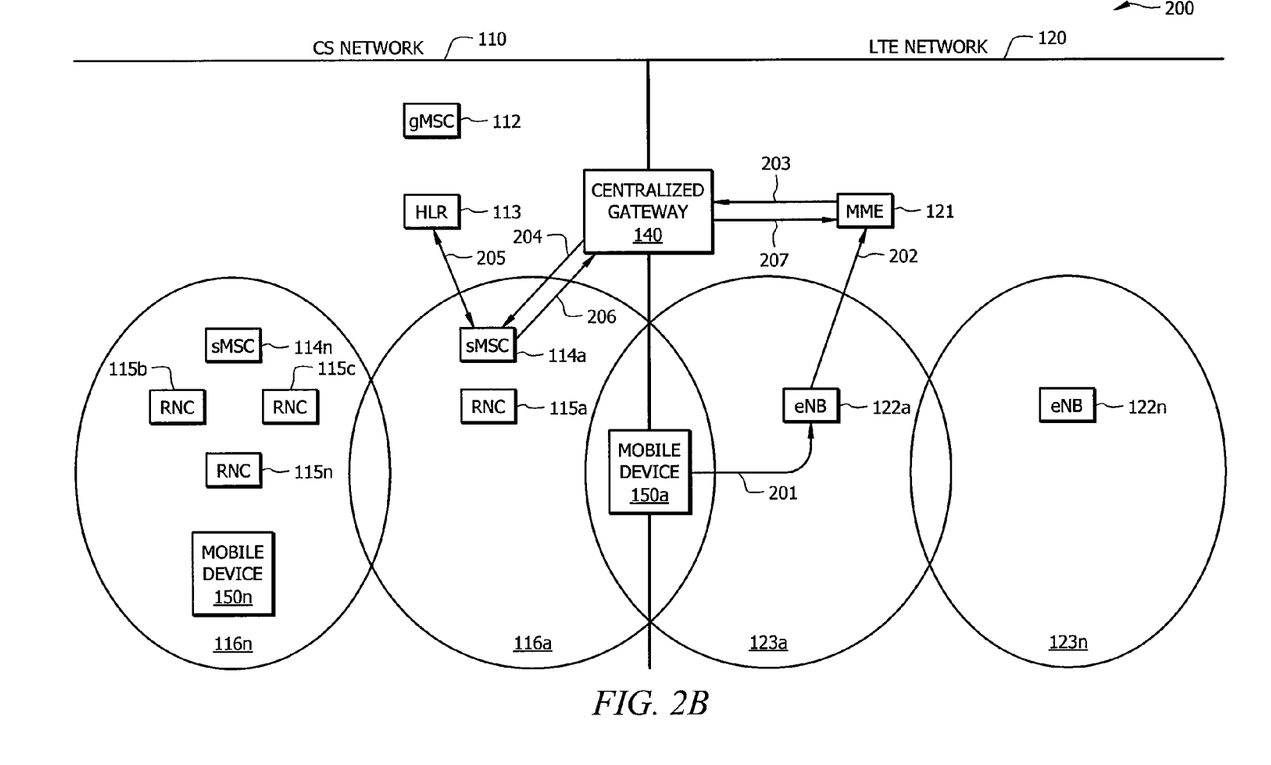
FIG. 2B is an example registration flow process of embodiments herein overlaid on the example system of FIG. 1.

FIG. 2A is an example flow process 200 of pre-registering mobile device 150a with a sMSC of the CS network 110, while mobile device is attached to LTE network 120. By pre-registering mobile device 150a with the serving mobile switching center (sMSC) in the CS network 110, an inbound or outbound CS communication can be setup with mobile device 150a more quickly as compared to traditional CSFB systems and methods thereby shortening the delay experienced by a service provider customer. Process 200 may include steps not shown, and steps of process 200 may be omitted, as is desired. For additional clarity, FIG. 2B shows steps of example process 200 overlaid on example system 100.

In step 201, mobile device 150a attaches to LTE network 120. For example, mobile device 150a may perform an Evolved Packet System/International Mobile Subscriber Identity (EPS/IMSI) Attach. In embodiments, when a mobile device is turned on, the mobile device will look for a network for attachment. Mobile devices may be configured to use LTE network 120 for data services and configured with CSFB support to use CS network 110 for voice services. Mobile device 150a may be configured to default its attachment to LTE network 120 when possible. After turned on, mobile device 150a identifies LTE network 120, attaches to LTE network 120, and sends a message to eNB 122a indicating the attachment.

In step 202, after successfully attaching with the LTE network, the mobile device sends a non access stratum (NAS) message containing a location updating request to eNB 122a which sends it to the MME 121. Upon MME 121 receiving the location updating request, MME 121 sends a location updating request to the centralized gateway 140. An example location updating request is a SGs Application Part (SGsAP) LOCATION-UPDATE-REQUEST. Each MME of an LTE network may be assigned a unique Tracking Area (TA) ID while each MSC may be assigned a Location Area (LA) ID. MME 121 may comprise a TA to LA mapping and may add the LA ID when sending the location update request to centralized gateway 140. The LA ID may be used to determine which sMSC is servicing mobile device 150a.

After receiving the location update request, in step 204, centralized gateway 140 converts the location updating request into a request that is compatible with CS network 110, for example, a Radio Access Network Application Part (RANAP) location updating request. Centralized gateway 140 sends the CS network compatible location updating request to the serving mobile switching center (sMSC) that mobile device 150a is located within. In this example, centralized gateway 140 sends the CS network compatible location updating request to sMSC 114a because mobile station 150a is within the territory of sMSC 114a. Centralized gateway 140 may use the LA ID from the location update request to determine which sMSC is servicing mobile device 150a. For example, centralized gateway 140 may comprise a LA ID to MSC IP address mapping that may be used to find the correct MSC based on the LA ID.

In step 205, sMSC 114a communicates back and forth with HLR 113 using CS network communication protocols, and sMSC 114a downloads a user profile associated with mobile device 150a. With the user profile downloaded, sMSC 114a registers mobile device 150a with sMSC 114a. This registration can be considered a pre-registration of mobile device 150a because mobile device 150a is registered with sMSC 114a while attached to LTE network 120 and/or before mobile device 150a switches to CS network 110.

In step 206, sMSC 114a sends a notification to centralized gateway 140 that the location update request was accepted. This notification may be a RANAP location updating accept response. With the received notification of success, centralized gateway 140 registers mobile device 150a with centralized gateway 140. As such, mobile device 150a is concurrently registered with centralized gateway 140 and sMSC 114a.

In step 207, centralized gateway 140 sends a notification to MME 121 indicating that the location update request was accepted. The notification may be in LTE communication protocols. For example, centralized gateway 140 may send MME 121 an SGsAP-LOCATION-UPDATE-ACCEPT.

As a result of example process 200, mobile device 150a is concurrently attached to the LTE network and registered with both sMSC 114a of the CS network and centralized gateway 140, which is operational in both the CS network and the LTE network. This concurrent attachment and registration allows mobile device 150a to communicate using LTE network 120 and reduces the time involved to set up a CS communication that is inbound for mobile device 150a. Further, when the mobile device is redirected by the LTE network to use the CS network for voice call setup, the mobile device may skip registering again with the CS network resulting in faster call setup.

At this point, mobile device 150a is attached to LTE network 120; however, from time to time a CS communication may be inbound to mobile device 150a. Because the inbound communication is CS communication, it may be desirable for mobile device 150a to switch to CS network 110 in order to receive the inbound CS communication. However, when mobile device 150a is attached to LTE network 120, mobile device 150a may not be aware that a CS communication is inbound and that switching to CS network 110 would be desirable. As such, it would be useful to have systems and methods that indicate to mobile device 150a that switching to CS network 110 may be desirable.

Figure 3A:
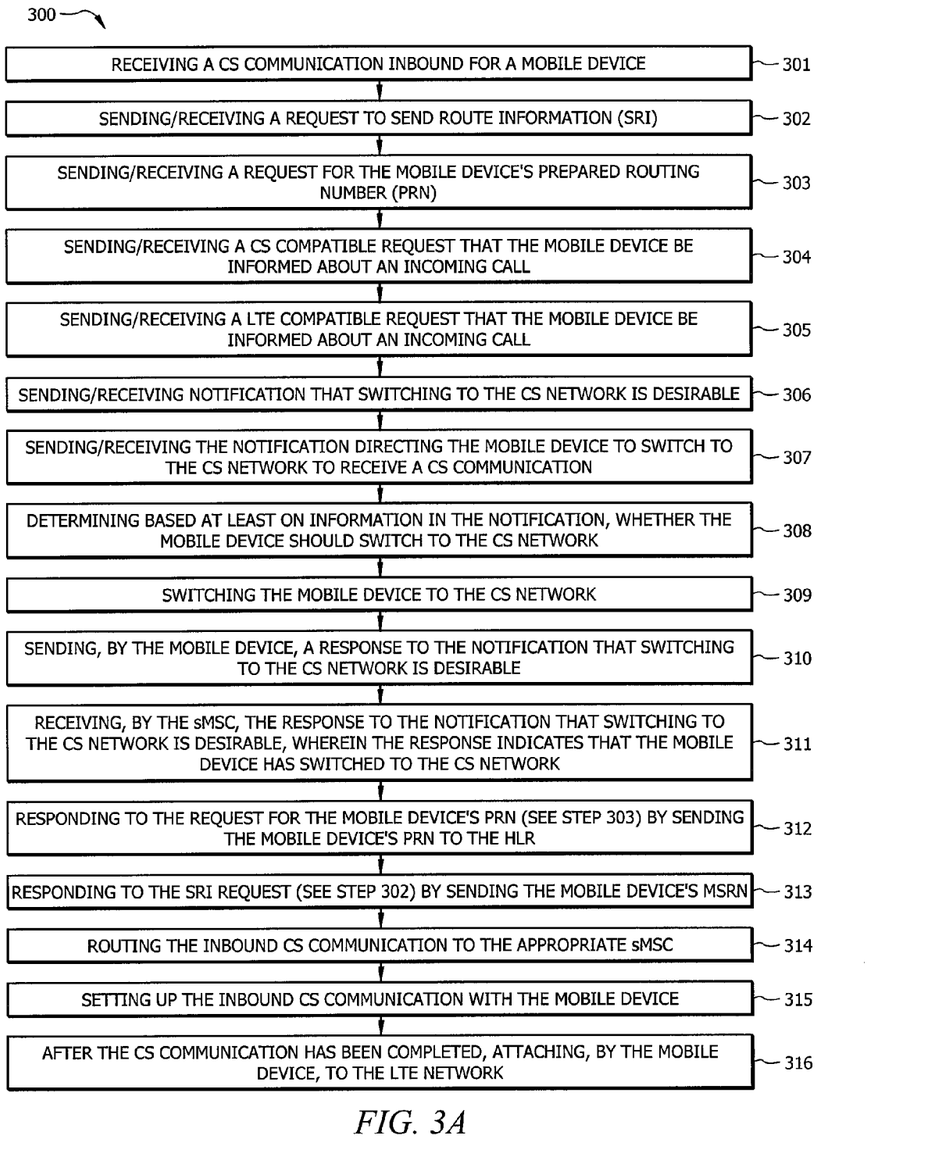
FIG. 3A is an example mobile terminated CS communication flow process of embodiments herein.

FIG. 3A is an example process 300 which notifies a mobile device that a CS communication is incoming. An example of a CS communication may be a communication that is compatible with the CS network, for example a voice communication, a phone call, and/or the like. For ease of explanation, process 300 will process a CS communication that is an incoming phone call; however, other CS communications may be handled according to process 300. If desired, some steps of process 300 may be omitted and/or additional steps may be added.

Figure 3B:
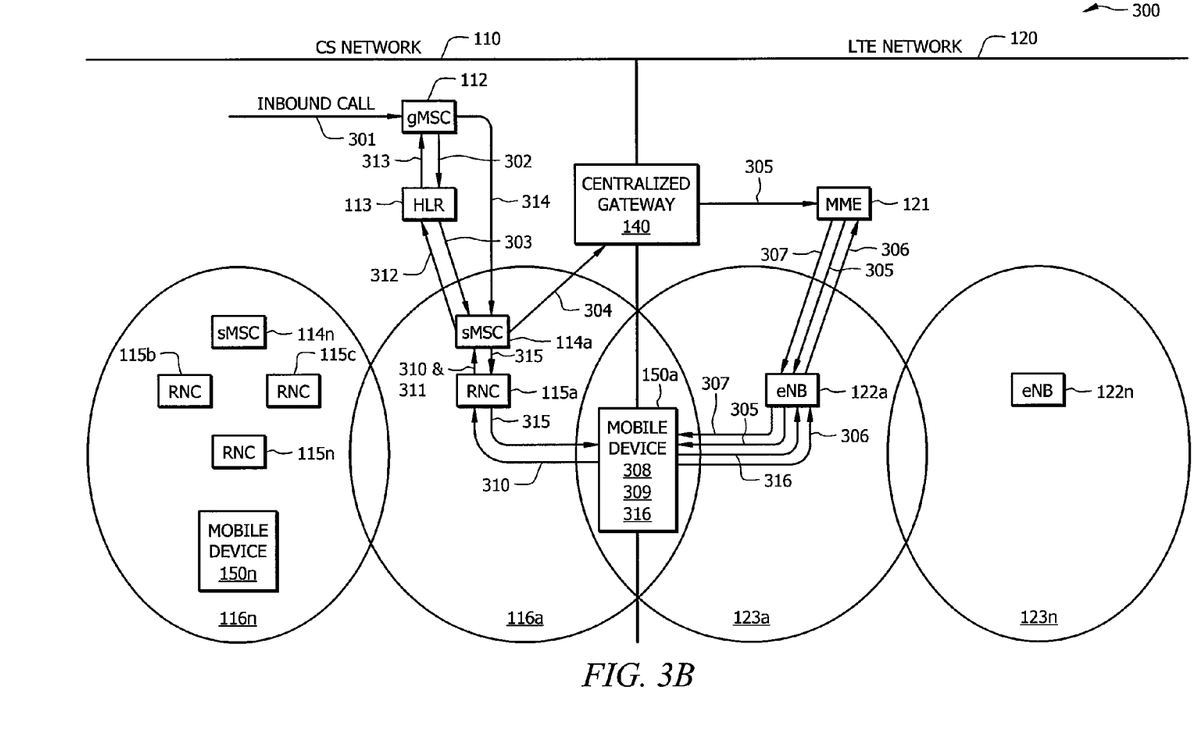
FIG. 3B is an example mobile terminated CS communication flow process of embodiments herein overlaid on the example system of FIG. 1.

In process 300, it is assumed that mobile device 150a is concurrently attached to LTE network 120 as well as registered with the CS network 110, when CS network 110 receives an incoming phone call that is destined for mobile device 150a. In step 301, gMSC 112 receives the inbound call. The set up information of the inbound call indicates that the call is inbound for mobile device 150a. In step 302, gMSC 112 sends a Send Route Information (SRI) request to home location register (HLR) 113. A SRI request assists in routing the inbound call to mobile device 150a.

In step 303, HLR 113 identifies that the call is inbound for mobile device 150a and knows that mobile device 150a is already registered with sMSC 114a. HLR 113 gained the registration knowledge during step 205 described above. Knowing that mobile device 150a is already registered with sMSC 114a, HLR 113 sends a Provide Routing Number (PRN) request to sMSC 114a.

In step 304, sMSC 114a sends a message to centralized gateway 140 requesting that mobile device 150a be informed about the incoming call. The message may be a paging request and may be communicated according to CS communication protocols. Centralized gateway 140 may receive the message and convert it into a message that is compatible with LTE network 120. In step 305, centralized gateway 140 sends a message to mobility management entity (MME) 121 requesting that the mobile device be informed about the incoming call. The message may be a paging request and may be communicated according to LTE communication protocols. Upon mobile device 150a receiving the page, mobile device 150a may connect to MME 121.

When mobile device 150a connects with MME 121, in step 306, mobile device 150a may send an Extended Service Request for mobile terminating circuit switch (CS) fallback to MME 121. In response to receiving the Extended Service Request, MME 121 may send a SGs Service Request message to centralized gateway 140 containing an indication that mobile device 150a was in idle mode. MME 121 may send a notification to eNB 122a indicating that device 150a should move to CS network 110. Upon receiving the notification, eNB 122a may send the notification to mobile device 150a directing it to CS network 110. The notification may be a radio resource control RRC connection close message and may be sent to mobile device 150a according to LTE communication protocols via eNB 122a.

At step 307, mobile device 150a receives the notification that switching to the CS network is desirable. At step 308, based at least on information in the notification, mobile device 150a may determine whether or not to switch to CS network 110. If mobile device 150a decides not to switch to CS network 110, CS network will become aware of the denial and the incoming call with be dropped. In step 309, mobile device 150a decides to switch to CS network 110 and switches to CS network 110. When switching to CS network 110, mobile device 150a may suspend its attachment to LTE network 120, or if desired, terminate its attachment to LTE network 120. Alternatively, mobile device 150a may remain attached to LTE network 120.

In step 310, in response to the notification received from MME 121, mobile device 150a may send a message to sMSC 114a. Mobile device 150a has switched to CS network 110 at this point, so the message may be sent in the CS network according to CS communication protocols. The message may be sent from mobile device 150a to sMSC 114a via only CS network devices. As such, the message sent to sMSC 114a may reach sMSC 114a without being received/forwarded by any device which operates exclusively in LTE network 120. The message may be interpreted by sMSC 114a as being a response (e.g., Paging Response) that responds to the sMSC's message (e.g., Paging Request) of step 304.

In step 311, sMSC 114a receives the message from mobile device 150a (e.g., Paging Response). The message may indicate that mobile device 150a is attached to CS network and as such is capable of receiving a call via the CS network.

In step 312, sMSC 114a may respond to the HLR's PRN request of step 303 by allocating a Mobile Station Roaming Number (MSRN) from a pool of MSRNs to associate with mobile device 150a and sending a PRN response along with the MSRN to HLR 113. In step 313, HLR 113 may respond to gMSC's SRI request (of step 302) by sending an SRI response including the MSRN of mobile device 150a.

In step 314, having received the MSRN of mobile device 150a, gMSC 112 routes the inbound call to appropriate sMSC 114a. The appropriate sMSC 114a, is the sMSC which is servicing the mobile device based at least on the location of the mobile device being within the sMSC's territory. Having received the inbound call, at step 315, sMSC 114a sets up the inbound call with mobile device 150a using CS network 110 and returns the MSRN back to the pool for future use. Then with the call set up, mobile device 150a conducts the call via the CS network according to CS communication protocol.

After the call has been completed and disconnected, in step 316, mobile device 150a may switch back to LTE network 120 for data communications. However, mobile device 150a remains concurrently registered with sMSC 114a and centralized gateway 140.

Because mobile device 150a was concurrently registered with sMSC 114a and centralized gateway 140 before gMSC 112 received the incoming call, the registration steps did not need to be performed after gMSC 112 received the inbound call. Because the registration process does not need to be performed after an inbound call is originated, the call set up takes less time, thereby minimizing latency and improving customer satisfaction for inbound calls. Further, because the registration process does not need to be performed after a call is originated from the mobile device, the call set up time takes less time, thereby minimizing latency and improving customer satisfaction for outgoing calls as well.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A method comprising:
   registering a mobile device that is attached to a long term evolution (LTE) network with a centralized gateway that is configured to communication in the LTE network and a circuit-switched (CS) network;

in response to receiving, at the centralized gateway, an LTE location update request from the mobile device:
determining a serving mobile switching center (sMSC) in the CS network that is operable to service CS communications with the mobile device, wherein the determination is based at least on the mobile device's location within the sMSC's territory; and
pre-registering the mobile device with the sMSC of the CS network, wherein the mobile device is pre-registered while concurrently attached to the LTE network;

determining that a CS communication associated with the mobile device has been originated; and directing the mobile device to perform a Circuit Switch Fallback (CSFB) in order to service the originated CS communication.

2. The method of claim 1 wherein the pre-registering occurs prior to the CS communication associated with the mobile device having been originated.

3. The method of claim 1 wherein the CS communication is inbound to the mobile device.

4. The method claim 1 wherein the CS communication is outbound from the mobile device.

5. The method of claim 1 wherein the CS communication is a voice call.

6. The method of claim 1 wherein the CS communication will be set up by the sMSC.

7. The method of claim 1 wherein the centralized gateway is configured to:
communicate via the LTE network according to LTE communication protocols;
communicate via the CS network according to CS communication protocols; and
convert communications between the LTE communication protocols and CS communication protocols.

8. The method of claim 1 wherein the pre-registering comprises:
converting, by the centralized gateway, the LTE location update request into a CS location update request;
sending, by the centralized gateway, the CS location update request to the sMSC of the CS network;
receiving, by the centralized gateway, a CS location update accept or a CS location update reject;
converting, by the centralized gateway, the CS location update accept or the CS location update reject into a LTE location update accept or a LTE location update reject, respectively; and
sending, by the centralized gateway, the LTE location update accept or the LTE location update reject to a mobility management entity (MME) of the LTE network.

9. The method of claim 8 wherein the pre-registering comprises:
pre-registering the mobile device with the sMSC based at least on information of the CS location update.

10. A system comprising:
a centralized gateway operable to:
communicate via a long term evolution (LTE) network according to LTE communication protocols,
communicate via a circuit-switched (CS) network according to CS communication protocols,
convert communications between the LTE communication protocols and the CS communication protocols,
register, with the centralized gateway, a mobile device that is attached to the LTE network,
in response to receiving, at the centralized gateway, an LTE location update request from the mobile device:
determine a serving mobile switching center (sMSC) in the CS network that is operable to service CS communications with the mobile device, wherein the determination is based at least on the mobile device's location within the sMSC's territory, and
communicate with the sMSC to pre-register the mobile device with the sMSC of the CS network, wherein the mobile device is pre-registered while concurrently attached to the LTE network,
determine that a CS communication associated with the mobile device has been originated, and
send a notification initiating a Circuit Switch Fallback (CSFB) of the mobile device in order to service the originated CS communication.

11. The system of claim 10 wherein the pre-registering occurs prior to the CS communication associated with the mobile device having been originated.

12. The system of claim 10 wherein the CS communication is inbound to the mobile device.

13. The system claim 10 wherein the CS communication is outbound from the mobile device.

14. The system claim 10 wherein the CS communication is a voice call.

15. The system claim 10 wherein the CS communication will be set up by the sMSC.

16. The system claim 10 wherein when the centralized gateway is further operable to:
convert the LTE location update request into a CS location update request,
send the CS location update request to the sMSC of the CS network,
receive a CS location update accept or a CS location update reject from the CS network,
convert the CS location update accept or CS location update reject to a LTE location update accept or a LTE location update reject, respectively, and
send the LTE location update accept or LTE location update reject to a mobility management entity (MME) of the LTE network.

17. The system of claim 16 wherein the pre-registering comprises:
pre-registering the mobile device with the sMSC based at least on information of the CS location update.

18. A system comprising:
means for registering a mobile device that is attached to a long term evolution (LTE) network with a centralized gateway that is configured to communication in the LTE network and a circuit-switched (CS) network;
means for receiving an LTE location update request at the centralized gateway from the mobile device;
means for determining a serving mobile switching center (sMSC) in the CS network that is operable to service CS communications with the mobile device in response to receiving the LTE location update request at the centralized gateway, wherein the determination is based on at least on the mobile device's location within the sMSC's territory;
means for pre-registering the mobile device with the sMSC of the CS network in response to receiving the LTE location update request at the centralized gateway, wherein the mobile device is pre-registered while concurrently attached to the LTE network;
means for determining that a CS communication associated with the mobile device has been originated; and means for directing the mobile device to perform a Circuit Switch Fallback (CSFB) in order to service the originated CS communication.

19. The system of claim 18 wherein the pre-registering occurs prior to the CS communication associated with the mobile device having been originated.

20. The system of claim 18 wherein the CS communication is a voice call that will be set up by the sMSC.

* * * * *